United States Patent [19]
Betzen

[11] Patent Number: 6,014,951
[45] Date of Patent: Jan. 18, 2000

[54] ELECTRODE DESIGN FOR DEER REPELLENT DEVICE

[76] Inventor: Keith M. Betzen, P.O. Box 5604, Bloomington, Ind. 47407-5604

[21] Appl. No.: 09/345,137

[22] Filed: Jul. 6, 1999

[51] Int. Cl.[7] ................................................. A01K 15/02
[52] U.S. Cl. ............................................. 119/712; 43/98
[58] Field of Search .............................. 43/98, 112, 124; 119/712, 174; 231/7; 256/10

[56] References Cited

U.S. PATENT DOCUMENTS

| | | | |
|---|---|---|---|
| 922,377 | 5/1909 | Ames | 43/98 |
| 4,630,571 | 12/1986 | Palmer | 119/29 |
| 5,148,621 | 9/1992 | Rosen | 43/98 |
| 5,894,818 | 4/1999 | Betzen | 119/712 |

FOREIGN PATENT DOCUMENTS 82560  10/1919  Switzerland .

OTHER PUBLICATIONS

Copies of engineering drawing and photograph for model of deer repellent device having approximately semicircular electrodes.

Device is scheduled to be released this summer by Woodstream Corp. 69 N. Locust, Lititz, PA., 17534.

*Primary Examiner*—Thomas Price

[57] ABSTRACT

In order to deter deer from yards and gardens, an improved electrode design for a baited, shock-producing deer repellent device is provided. The devices are deployed in the area to be protected and deer, attracted to the scent oil used as bait, will receive a shock and be frightened from the area. The device consists of a protective housing which shelters the electronic components and batteries, and serves as the base for a long thin support stem which holds the scent dispenser and the electrodes at the desired height. The improved electrodes are configured to be almost complete circles which crisscross, without touching, at the top. The circular electrodes more completely surround the scent dispenser, thus improving the chances of a deer contacting the electrodes, regardless of the height or angle of the device or the size or approach angle of the deer.

5 Claims, 1 Drawing Sheet

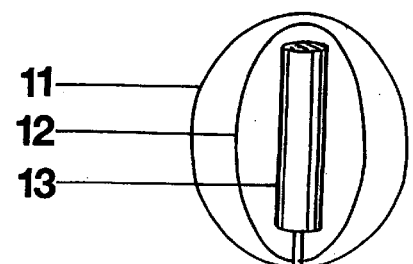
Fig. 1
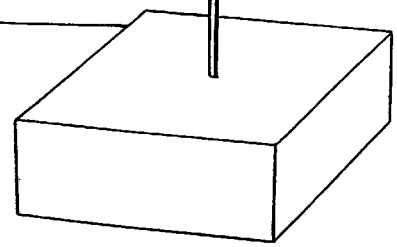
Fig. 2
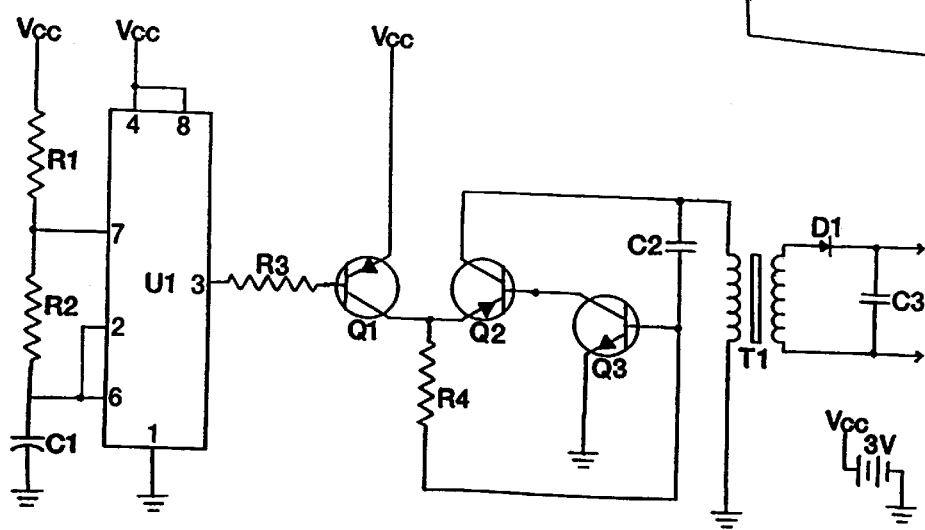

ELECTRODE DESIGN FOR DEER REPELLENT DEVICE

FIELD OF THE INVENTION

This invention relates to an electrode configuration for a deer deterrent device.

BACKGROUND OF THE INVENTION

Various electrode configurations have been described for portable, baited, shock-producing animal deterrent devices.

U.S. Pat. No. 922,377 to Ames (1909), shows an animal extermination device with the electrodes being two concentric, curved, metal plates which surround the bait. These electrodes are essentially in the same plane and so they do not protect the bait from an approach from the top. The device described by Ames is designed for small rodents and the like and is very large relative to the target animal. Using the electrode configuration as described by Ames on a device that is very small relative to the target animal would allow the animal to reach the bait without touching the electrodes since the bait is not protected from an approach from the top. Also, the chance of a deer contacting both electrodes as shown by Ames is greatly reduced by their smooth surface and the lack of any protruding electrodes.

Swiss Patent 82,560 to Baumann (1919) shows a device very similar to the device shown by Ames with the electrodes being two flat, concentric metal plates arranged in the same plane. This device has the same problems as the device described by Ames.

A device to train animals using an electric shock, with or without bait, is described in U.S. Pat. No. 4,630,571 to Palmer (1986), which uses the conductive outer case of the device as one electrode and the earth as the other. This electrode configuration is very ineffectual because the chance of a pest animal contacting the smooth surface of the outer case is greatly reduced by the lack of protruding electrodes. Also, the operation of this device is dependent upon the moisture content of the soil which serves as the other electrode.

A baited shock-producing device to control deer in yards and gardens has been described in U.S. Pat. No. 5,894,818 to Betzen (1999) in which the electrodes meant to contact the deer's nose and deliver the deterrent voltage are shown as short projections above the top surface of the device. These electrodes are not effective because the possibility of a deer contacting the electrodes is reduced by their short length.

Subsequent prototypes and commercial models of Betzen's device have used two crisscrossing semicircular electrodes projecting from the top of the protective housing for the electronic components. These semicircular electrodes extend over the top of a scent dispenser which releases a perfumed oil to attract the deer to touch the device. This configuration of electrodes, while much more effective than those shown in the patent to Betzen (1999), must be approached from near the top to be effective. With this semicircular arrangement of electrodes, the probability of a deer contacting both electrodes simultaneously is dependent upon the height and the angle of the device and the size and the approach of the deer.

The prior art devices disclosed herein do not provide an electrode arrangement for a baited, shock-producing deer repellent device which completely surrounds the scent source and which therefore improves the chances of a deer contacting the electrodes, regardless of the height or angle of the device or the size or approach of the deer.

SUMMARY OF THE INVENTION

It is evident that the prior art devices disclosed herein suffer from disadvantages which limit their efficiency.

Therefore a principle object of the present invention is to provide a more effective configuration for electrodes for a baited, shock-producing deer repellent device and to provide a method for repelling deer using a device incorporating the improved electrodes. The electrodes of the present invention are configured as complete circles which are opposed at 90 degreess. This arrangement serves to more completely surround the scent dispenser, and thereby improves the chances of a deer contacting the electrodes, regardless of the height or the angle of the device or the size of the approach of the deer. A circular electrode is a simple shape that works well to surround the scent dispenser although other shapes would also work. The design of the electrodes is critical to the performance of a baited, shock-producing deer repellent device. If a deer should touch one of these devices without being harmed it will learn that the device is not good to eat and so it will not touch the device again. In addition, since the device did not hurt the deer, it will ignore the device and proceed to eat everything in sight. The circular electrode design of the present invention increases the chances of successful contact with the deer's nose, tongue or lips.

Another object of the present invention is to provide an esthetic and practical configuration for a deer repellent device which accommodates the circular arrangement of electrodes of the device. In order to surround the bottom part of the scent dispenser with electrodes, in the device of the present invention, the electrodes and scent dispenser are supported at the desired height on a long thin stem and the protective housing containing the electronic components and batteries form the base of the device and support the stem.

Another object of the present invention is to provide a deer repellent device that can be deployed anywhere, even on concrete. Since the batteries and electronic components are located at the bottom of this device, it has a low center of gravity and requires no stakes to hold it in place. Also the design of this device allows it to be easily picked up to replenish the attractant scent or to move it from place to place.

It can be seen that the combination of features incorporated into the device of the present invention solves prior problems associated with this type of deer repellent device. It can also be seen that the device of the present invention produces new and unobvious results that have not been produced by the prior art.

Additional features will become apparent from a consideration of the ensuing drawings and description.

DESCRIPTION OF THE DRAWINGS

FIG. 1 shows a perspective view of the preferred embodiment of the invention.

FIG. 2 shows a circuit that could be used to maintain an electric potential across the electrodes.

DESCRIPTION OF THE PREFERRED EMBODIMENT

A preferred embodiment of the present invention is shown in FIG. 1, with the deer repellent device 10 having a positive circular electrode 11 and a negative circular electrode 12 which are opposed at ninety degrees to enclose the scent dispenser 13, which in this embodiment is a wick soaked with a perfumed oil. The circular electrodes 11,12 are arranged so they do not touch at the top. The electrodes 11,12 and scent dispenser 13 are held at the desired height by the support stem 14, which also carries two wires from the electronic components (not illustrated) to the electrodes 11,12. The support stem 14 is joined to the protective housing 15 which serves to hold the device and to shelter the electronic components and the batteries (not illustrated). The electronic components provide a deterrent voltage across the electrodes 11,12 that is sufficient to teach the deer to avoid the area. The required number of repellent devices 10 are deployed in the area to be protected and when deer are attracted to the scent of the perfumed oil they will contact the electrodes 11,12 and so receive a shock and be frightened from the area. In this embodiment the repellent device 10 is about twenty inches tall, the circular electrodes 11,12 are made from 0.020" stainless steel spring wire and the diameter of the circles is about 1⅜".

FIG. 2 shows a schematic of a circuit that can be used to maintain a potential across the electrodes. This circuit uses a capacitor to store the deterrent energy used in the device. The circuit will charge capacitor C3 to about 360 volts when the battery voltage is about 3.1 volts and when transformer T1 has a primary/secondary ratio of 27/3078 (1/114). Ti has a 20 milliwatt power rating, a primary impedance of 8 ohms, and is operating in this circuit at 14 Khz. The values of the resistors are: R1=2.7M, R2=10K, R3=470 ohms and R4=33K. The values of the capacitors are: C1=470 uf, 10 volt, electrolytic; C2=0.047 uf, 10 volt, ceramic; C3=1.5 uf, 400 volt, metalized polyester. The types of the transistors are: Q1 and Q2 are 2N2907; Q3 is a 2N2222. The diode, D1, is a 1N4007. The timer, U1 is a ICM7555CN.

This circuit with these component values will charge the capacitor for 3.26 seconds with an interval of 14.7 minutes between charging pulses. The power supply for this circuit is 2 AA batteries in series. All components are ¼ watt, and all components are readily available, except the transformer, which is custom made.

This circuit involves the use of a capacitor to maintain a deterrent voltage in an animal deterrent device and this power system is the subject of the above mentioned U.S. Pat. No. 5,898,818 to Betzen (1999). Use of this technology would require license. Other circuits could also be used in this device; any power system that would maintain a potential across the electrodes could be used.

The descriptions of the present invention contained herein are exemplifications of typical embodiments and are considered as illustrative only of the principles of this invention. Although this description contains various specificities, these should not be construed as limitations on the scope of this invention. The circular configuration of electrodes described in the present invention could be used for animal species other than deer. The electrodes of this device could also be elliptical or another shape that would surround the scent source as well as a circular electrode. This device may be made with more than two electrodes and the protective housing could be disguised as an animal, a rock or a regular or irregular geometric shape. This device can operate with various electronic charging circuits and at a wide range of voltages, and other deterrents such as sharp sounds or noxious sprays could be incorporated. Other changes in size, color, materials, shape, form, function and manner of operation, assembly and use, are deemed readily apparent and do not depart from the scope of the present invention which is limited only by the following claims and their legal equivalents.

The invention claimed is:

1. A deer repellent device, comprising a protective housing enclosing batteries and electronic components which provide a deterrent voltage across a plurality of electrodes, and having support means to hold said electrodes and a scent dispenser, and with said electrodes being arranged to surround said scent dispenser so that said deer, attracted to said device, will touch said electrodes, closing the circuit between said electrodes and so receive an electric shock, with the improvement comprising said electrodes being configured to be almost complete circles opposed at 90 degrees which serve to completely surround said scent dispenser, whereby said electrodes function to improve the chances of said deer contacting said electrodes, regardless of the height or angle of said device or the size or approach angle of said deer.

2. The deer repellent device of claim 1 in which said repellent device includes two or more of said electrodes.

3. The deer repellent device of claim 1 in which said electrodes are elliptical, rectangular or another shape which serves to surround said scent dispenser.

4. The deer repellent device of claim 1 in which said protective housing is disguised as an animal, a regular or irregular geometric shape, a rock or another natural object.

5. A method of repelling deer comprising of steps of:

(a) deploying a deer repellent device in an area to be protected, with said device having an improved electrode arrangement being electrodes configured as almost complete circles which are opposed at 90 degrees, with said improved electrode arrangement more completely surrounding the scent dispenser of said device, whereupon said deer, attracted to said scent dispenser of said device and touching said electrodes of said device, will close the circuit between said electrodes and so receive an electric shock and be frightened from said area, and (b) maintaining said deer repellent devices having said improved electrode configuration in said area to be protected and so cause said deer to continue to avoid said area.

* * * * *